United States Patent [19]
Gerhold

[11] Patent Number: 6,016,094
[45] Date of Patent: Jan. 18, 2000

[54] SUPERCONDUCTING SHORT CIRCUIT CURRENT LIMITER

[75] Inventor: Jürgen Gerhold, Graz, Austria

[73] Assignee: Forschungszentrum Karlsruhe GmbH, Karlsruhe, Germany

[21] Appl. No.: 09/195,087

[22] Filed: Nov. 18, 1998

Related U.S. Application Data

[63] Continuation-in-part of application No. PCT/EP97/02976, Jun. 7, 1997.

[30] Foreign Application Priority Data

Jul. 13, 1996 [DE] Germany .......................... 196 28 358

[51] Int. Cl.$^7$ ...................................................... H01F 1/00
[52] U.S. Cl. ........................ 335/216; 335/297; 335/299; 336/DIG. 1; 361/19; 361/141; 323/355
[58] Field of Search ............................. 336/73, 165, 178, 336/DIG. 1; 361/19, 58, 111, 139, 141; 323/355, 357, 358, 362; 335/216, 296, 297, 299

[56] References Cited

U.S. PATENT DOCUMENTS

| | | | |
|---|---|---|---|
| 4,045,823 | 8/1977 | Parton | 361/58 |
| 4,684,882 | 8/1987 | Blain | 323/356 |
| 5,225,956 | 7/1993 | Hara et al. | 361/19 |
| 5,241,447 | 8/1993 | Barber et al. | 361/141 |
| 5,376,912 | 12/1994 | Casagrande | 336/178 |
| 5,390,064 | 2/1995 | Russo | 361/35 |
| 5,475,560 | 12/1995 | Onishi et al. | 361/41 |
| 5,546,261 | 8/1996 | Yoshida et al. | 361/19 |

FOREIGN PATENT DOCUMENTS

| | | |
|---|---|---|
| 7-006683 | 1/1995 | Japan . |
| 2 714 229 | 6/1995 | Japan . |

OTHER PUBLICATIONS

Tixador et al., "Hybrid AC Superconducting Current Limiter: Small Scale Experimental Model", IEE Proceedings: Generation, Transmission and Distribution, vol. 141, Nr. 2, Part C, Mar. 01, 1994, pp. 117–124.

Tixador et al., "Hybrid AC Superconducting Current Limiter Extrapolation 63 KV–1 250 A", Journal de Physique III, vol. 4, Nr. 4, Apr. 04, 1994, pp. 604–608.

*Primary Examiner*—Lincoln Donovan
*Assistant Examiner*—Tuyen T. Nguyen
*Attorney, Agent, or Firm*—Klaus T. Bach

[57] ABSTRACT

In a superconducting short circuit current limiter for an AC power supply net including an iron core, a primary coil and a secondary short-circuited superconductive coil, both being magnetically coupled with the iron core but being arranged at a distance from each other, the iron core has gaps at opposite sides of the secondary coil for thermally uncoupling the secondary coil from the rest of the magnetic core and a tertiary coil is arranged closely adjacent the primary coil in a magnetically strongly coupled relationship therewith, and has a heat capacity sufficient to accommodate the joulean heat generated when a fault or short circuit occurs in the power supply net, and the iron core has an area of reduced cross-section which is so selected that it becomes magnetic flux saturated when the current in the primary coil exceeds a predetermined reaction current level.

6 Claims, 2 Drawing Sheets

SUPERCONDUCTING SHORT CIRCUIT CURRENT LIMITER

This is a continuation-in-part application of pending international application PCT/EP97/02976 filed Jun. 7, 1997 and claiming the priority of German application 196 28 358.2 filed Jul. 13,1996.

BACKGROUND OF THE INVENTION

The invention relates to a superconducting short circuit current limiter for an alternating current network, comprising a closed iron core with a primary winding which is part of an electric power supply line to be protected and a short-circuited superconducting secondary winding disposed on the iron core in spaced relationship from the primary winding whereby the current in the secondary winding cannot rise beyond a certain value when the nominal current flow in the primary winding is exceeded.

The control of short circuits in electric power supply nets becomes increasingly expensive with the expansion and interfacing of the power supply networks. With the measures commonly in use at this point, such as adapted short circuit voltages of the transformers and sufficient power line impedances, rapid circuit breakers with tripping currents of sometimes far above 50 kA and inserted short circuit limiting throttles, the electric power supply nets cannot be protected adequately. This is especially true if, with continuing deregulation, the net configurations and operating conditions can no longer be freely selected on the basis of the given short circuit capabilities of the system. High voltage rigidity during separation is basically not compatible with short circuit limiting impedances. Consequently, new types of short circuit protection methods or needed. Conventionally, for example, the current has been limited by the First-Zero-Interrupter (FZ1) technique. Its essential disadvantage however is the unlimited occurrence of possibly high-impulse short circuit amplitudes which subjects the equipment components to high mechanical forces and possible failure.

It is desirable to limit or eliminate already the impulse short circuit current. This requires a current limiter which acts without delay when a certain current level is exceeded. Such a rapidly acting over current protection is especially necessary if the net includes superconductive building components.

Current limiters with such a property are the superconductive fault current limiters (SCFCL). For such applications transformers have been proposed whose primary coils are connected at a predetermined location of a network to be protected. They have a superconducting secondary coil, for example, in the form of a cylinder which is short circuited. Both coils are disposed on an iron core and are therefore magnetically highly coupled with each other up to a point at which the iron core is saturated.

The operation of such a superconducting short circuit current limiter is based on the fact that, when the current in the primary coil exceeds the nominal current $I_N$ an impedance $Z_{(t)}$ is built up in the short circuit as the current increases above the response current level $I_T$. This impedance $Z_{(t)}$ grows rapidly from zero to an end value and limits the current to an acceptable current level of:

$$I_{lim} = U/Z_{lim}$$

In a first approximation, U is the net voltage which is considered to be constant. (In a low resistance grounded rotating current net each phase needs to be provided with such a short circuit limiter for an effective protection).

J. Acero et al., describes on pages 1071 to 1074 of "Current Limiter Based on Melt Processed YBCO Bulk Superconductors" published in IEEE Trans. on Appl. Superconductivity, Vol. 5, No. 2, June 1995, the design and manufacture of a superconducting current limiter.

In the same publication on pages 1059–1064, W. Paul et al., describe a test of a symmetrically constructed high—Tc superconducting current limiter with a three-leg yoke.

DE-OS 195 24 579 discloses as current limiter a transformer wherein fault currents to be limited flow through the primary coil and which includes a superconductive ring as a secondary coil. The secondary coil is cooled in a cooling container below the critical temperature of the ring material. The ring is formed by a thin annular layer on a carrier cylinder and forms therewith a compound body.

Basically, such a superconductive short circuit limiter is an axial transformer which acts as a non-linear current-dependent impedance.

It operates as follows:

The primary coil of the transformer is installed in the power line to the be protected. It is at line voltage. The power line current is, consequently, the primary current $I_p$ of the transformer. During normal operation, that is, from no load up to normal current flow, the short-circuited superconductive secondary coil is always counter-excited up to the full primary current flow compensation. By design, the secondary coil is a short circuited coil or a short circuit ring or cylinder. Particularly, a cylinder is quite suitable for the manufacture from high temperature superconducting materials.

The ideal transformer generates no voltage drop at its primary coil since the flux in the iron is zero. There is no stray flux or it is negligible. When the response level current $I_T$ is exceeded also the critical current flow $I_{skrit}$, that is the limit of the superconducting current flow capacity of the superconductor is reached. The secondary current flow cannot further increase from here on even with good cooling. As a result, a magnetic field flux is generated in the iron core of the transformer dependent on the power line short circuit current flow which builds up in the primary coil a backlash voltage which limits the short circuit current. At the same time, in the secondary coil a voltage is induced which, together with the residual current still flowing in the superconducting coil, generates heat losses heating the superconductor.

For limiting unacceptably high switching over-voltages in the net, a normally conductive tertiary coil is wound onto the iron core.

With the usual size dimensioning of such an axial transformer the line voltage and the normal current value were the decisive factors. Iron saturation was to be avoided and the cross-sections were sized for assymetric short circuits, that is, the iron core cross-section was then twice that of a corresponding power transformer. This however results in high iron weights.

It is the object of the present invention to provide a superconducting short circuit limiter which fulfills the following requirements: It should provide for:

a negligible impedance and negligible operational losses during normal operation;

well defined impedance and acceptable losses while a short circuit occurs;

a time dependent control of the impedance build up z(1) such that the impulse short circuit current remains securely limited but, on the other hand, no unacceptably high over-voltages will be initiated, rapid availability at the end of the short circuit, a compact design having the least possible weight, high operational safety during long term operation, automatic operation.

SUMMARY OF THE INVENTION

In a superconducting short circuit current limiter for an AC power supply net including an iron core, a primary coil and a secondary short-circuited superconductive coil, both being magnetically coupled with the iron core but arranged at a distance from each other, the iron core has gaps at opposite sides of the secondary coil for thermally uncoupling the secondary coil from the rest of the iron core and a tertiary coil is arranged closely adjacent the primary coil in a magnetically strongly coupled relationship therewith, and has a heat capacity sufficient to accommodate the joulean heat generated when a fault or short circuit occurs in the power supply net, and the iron core has an area of reduced cross-section which is so selected that it becomes magnetic flux saturated when the current in the primary coil exceeds a predetermined reaction current level.

The iron core, which includes the small gaps but is otherwise closed, is kept small in cross-section, at a predetermined location or over a predetermined area so that, when the current flow exceeds a critical value above the nominal value for the power line to be protected, the iron becomes rapidly saturated in the area of reduced cross-section because there is then no counter excitation in the secondary coil after the critical superconductor current has been reached and the magnetic flux buildup in the iron core has begun.

In consideration of switching over-currents the superconducting fault current limiter (SCFCL) reacts to predetermined multiples of the nominal current amplitude for example at twice the nominal current amplitude or even at still higher levels. This critical multiple of the nominal current amplitude is based on the level of the critical current $I_{skrit}$ in the superconductor of the secondary coil taking the transformer ratio into consideration. In this way, there is also no need for the close magnetic coupling between the primary and the secondary coil which is required for normal operation. The reason is that there is still a magnetic flux path available in the unsaturated iron area, but otherwise the magnetic flux which interlinks the primary coil and the tertiary coil has to pass through the air.

The tertiary coil which is installed for the attenuation of transient processes and includes a resistance is arranged spatially directly adjacent the primary coil so that it is always strongly coupled magnetically by way of the magnetic field of the primary coil which is then present, particularly during a short circuit or fault current occurrence. In addition, the tertiary coil is so designed that it provides for a sufficient heat capacity so that is can accommodate the Joule-heat generated therein by the compensation current without being detrimentally affected thereby and without requiring any technical means for the removal of the heat.

In a preferred arrangement, the part of the iron core which is surrounded by the primary coil is hollow cylindrical and the tertiary coil is disposed therein co-axially with the primary coil. Such an arrangement saves a substantial amount of weight. In the hollow part, the iron core cylinder has only sufficient wall thickness such that it does not become saturated up to the reaction current level. The iron core could be wound, for example, spirally from transformer sheet metal whereby annular currents which would generate losses are prevented while the structure is easy to manufacture. Since, at the same time, the tertiary coil is received in the spirally wound cylindrical core co-axially with the primary coil, there is a strong magnetic coupling and also the necessary compensation current is generated. For this purpose, the tertiary coil consists of a material with a high specific resistance such as brass or resistance wire. The exact design however is based on the desired ohmic resistance, the needed heat capacity and the desired design features.

Since the secondary coil is a superconducting component cryotechnical equipment is provided for cooling the coil. The cooling capacity depends on the maximum requirements under short circuit conditions and on the heat influx during normal operation. The latter is maintained low by two interruptions in the heat flow path in the iron. These are generated by providing small air gaps in the iron core outside the secondary coil at both sides thereof and if necessary, these gaps are filled with a heat insulating material, or respectively, a highly insulating low temperature isolation.

In the area of the superconductive secondary coil, the iron core cross-section is preferably as close as possible to the superconductive short circuit cylinder so that the stray flux is insignificant during normal operation.

The secondary coil consists preferably of a superconductive short circuit cylinder. The superconductive material is preferably a high temperature superconductor which can be easily deposited on a cylindrical support member by coating procedures. But it is also possible to use short circuit cylinders which are known in the art under the designation bulk cylinders and are commercially available as building components. A conventional short circuited coil element which, in the most simple form, is a short circuit ring, may also be used as the secondary coil.

Below, the invention will be described in greater detail on the basis of the accompanying schematic drawings.

DESCRIPTION OF PREFERRED EMBODIMENTS

Figure 1:
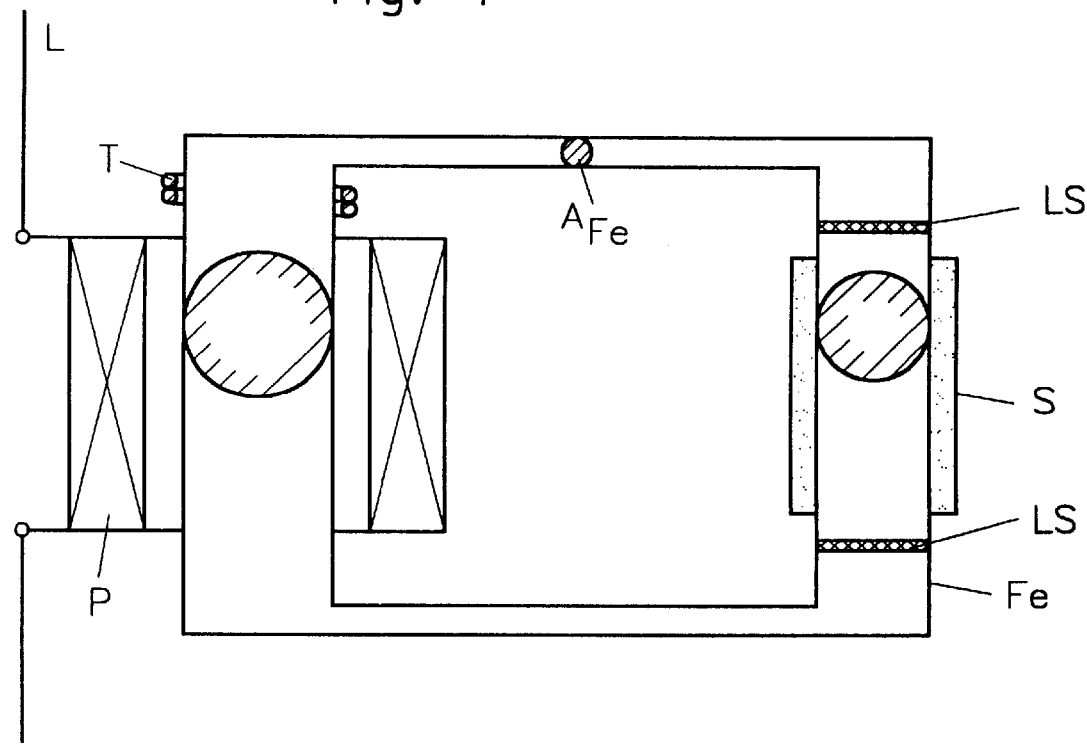
FIG. 1 is a basic representation of a short circuit current limiter.

During normal operation, that is, from idle up to the response current level $I_T$, the axial transformer for limiting the short circuit current is a transformer with a short circuited secondary coil. In its mode of operation, it is comparable with a current converter. For this reason, it is installed with its primary coil P longitudinally in the line L to be protected (FIGS. 1 and 2) such that the line current is always the primary current $I_p$ in the transformer.

During normal operation, there is a close magnetic coupling between the primary coil P and the secondary coil S (superconductive short circuit cylinder). This coupling is achieved by the iron core Fe. During normal operation, no voltage is to be induced. Therefore the magnetic fluxes generated by the primary and secondary coils and bundled by the iron core Fe must compensate each other. The stray flux of the transformer is insignificant during normal operation because the iron core Fe is designed to be disposed closely adjacent the coils taking into consideration the dielectric strength. A secondary coil in the form of a short circuited cylinder is particularly advantages since its voltage is very low.

The compensating counter excitation in the secondary coil S can occur only until a critical current $I_{skrit}$ is reached. For the design of the secondary coil, it is to be considered that the critical current $I_{skrit}$ in the superconductive short circuit cylinder is dependent on the response level current $I_T$ which is a multiple of the nominal current $I_N$ in the primary coil, taking into consideration the transformer ratios at the response level current $I_T$.

Short circuit currents which are greater than the nominal current $I_N$ should, on one hand, be safely limited to a maximally admissible current $I_{lim}$ which can be ensured by limiting the secondary counter excitation when the critical superconductor current $I_{lim}$ has been reached and the magnetic flux buildup in the primary coil has been initiated thereby. On the other hand, the heat generation in the secondary coil during fault or short circuit occurrences should be limited. To achieve this the magnetic uncoupling of the secondary and primary coils must be effected rapidly and effectively. This is possible if the cross-section $A_{Fe}$ of the iron core Fe is at least at one location over a predetermined area so small that magnetic flux saturation is reached at the predetermined response current level $I_T$. From this point on, the two coils P and S are magnetically uncoupled. The current in the power line L is then suddenly subjected to a longitudinal impedance $Z_{(t)}$ in the primary coil whereby the current flow can be limited to the fault current $I_{lim}$. With a current flow $I>I_T$, the primary coil P, which is then uncoupled from the secondary coil, acts as a current limiting impedance. In unsaturated areas of the iron core, the magnetic field lines are still bundled but in the saturated areas additional magnetic flux must pass through the air. The magnetic coupling of the two windings P and S by way of the air as it may occur under fault or short-circuit conditions is very small or insignificant since the secondary winding is spatially remote from the primary winding. The iron saturation in the small iron core cross-section $A_{Fe}$ represents, in a way, a magnetic switch $M_{pz}$ (see FIG. 3), that is, the counterinductivity $M_{ps}$ is non-linearly primary current dependent: it disappears for currents which exceed the reaction current level $I_T$.

With the uncoupling of the secondary coil S, no additional voltage is induced therein so that the heating of the superconductive short circuit cylinder S remains limited. As a result, there are no further losses.

In order to heat-insulate the secondary coil from the rest of the current limiter, the iron core includes gaps LS at opposite sides of the secondary coil S. The gaps may be air gaps or they may be filled with a heat insulating material or they may be evacuated.

Figure 2:
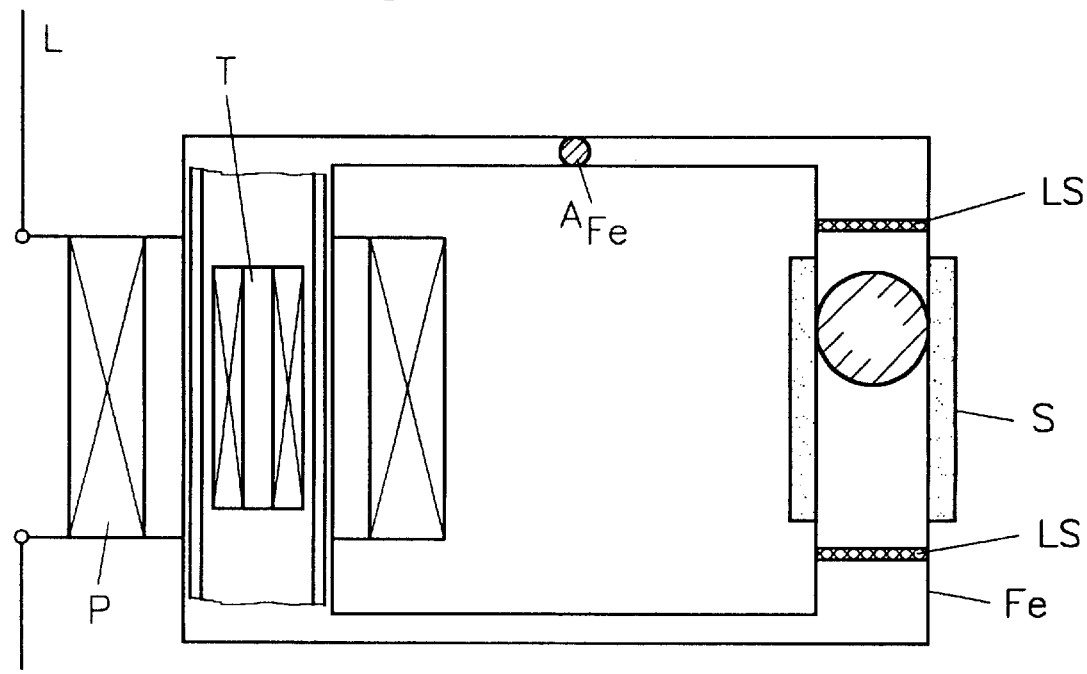
FIG. 2 shows the short circuit current limiter with hollow cylindrical iron core areas.

FIG. 2 shows schematically the hollow wound iron core Fe which has a relatively small cross-section in the area of the primary coil P. It may be a hollow cylinder wound spirally from condenser sheet metal in order to suppress eddy current losses. In addition, it may consist of low quality iron since it has to carry no flux while the line current is within its nominal range. Also, the iron core may consist of layered iron sheets.

The eventual non-linear behavior in the area of zero voltage passages of the line current is accounted for by the tertiary coil T with an ohmic resistance $R_T$ in the form of the higher specific tertiary conductor resistance. The tertiary coil T attenuates the non-linearites particularly the overvoltages by generating compensation currents. In order to be able to develop this effect, the tertiary coil T is arranged co-axially with the primary coil P within the hollow space of the iron core Fe. This provides for the desired strong magnetic coupling with the primary coil P during fault or short circuit occurrences. Only, when the iron core is saturated will the magnetic flux extend through the tertiary coil T. Under normal operation, the magnetic flux extends solely through the unsaturated iron core Fe so that the tertiary coil is shielded that is, there is a flux compensation to zero in the iron core Fe.

The tertiary coil T is important already during the first response of the short circuit current limiter. Without the tertiary compensation current, the transient switching overvoltage occurring during a rapid current reduction in the superconducting cylinder S would be very high because the energy stored inductively in the net would have to be transferred to the transformer inductivity.

The tertiary coil T, which has a given resistance uncouples the transient processes from the behavior of the superconductive winding S.

In the area of the primary coil P, the hollow core fulfills at the same time three requirements; it provides for the smallest possible iron cross-section, it provides a space for the tertiary coil T while being strongly coupled therewith and an uncoupling of the secondary coil during fault or short circuit occurrences.

Figure 3:
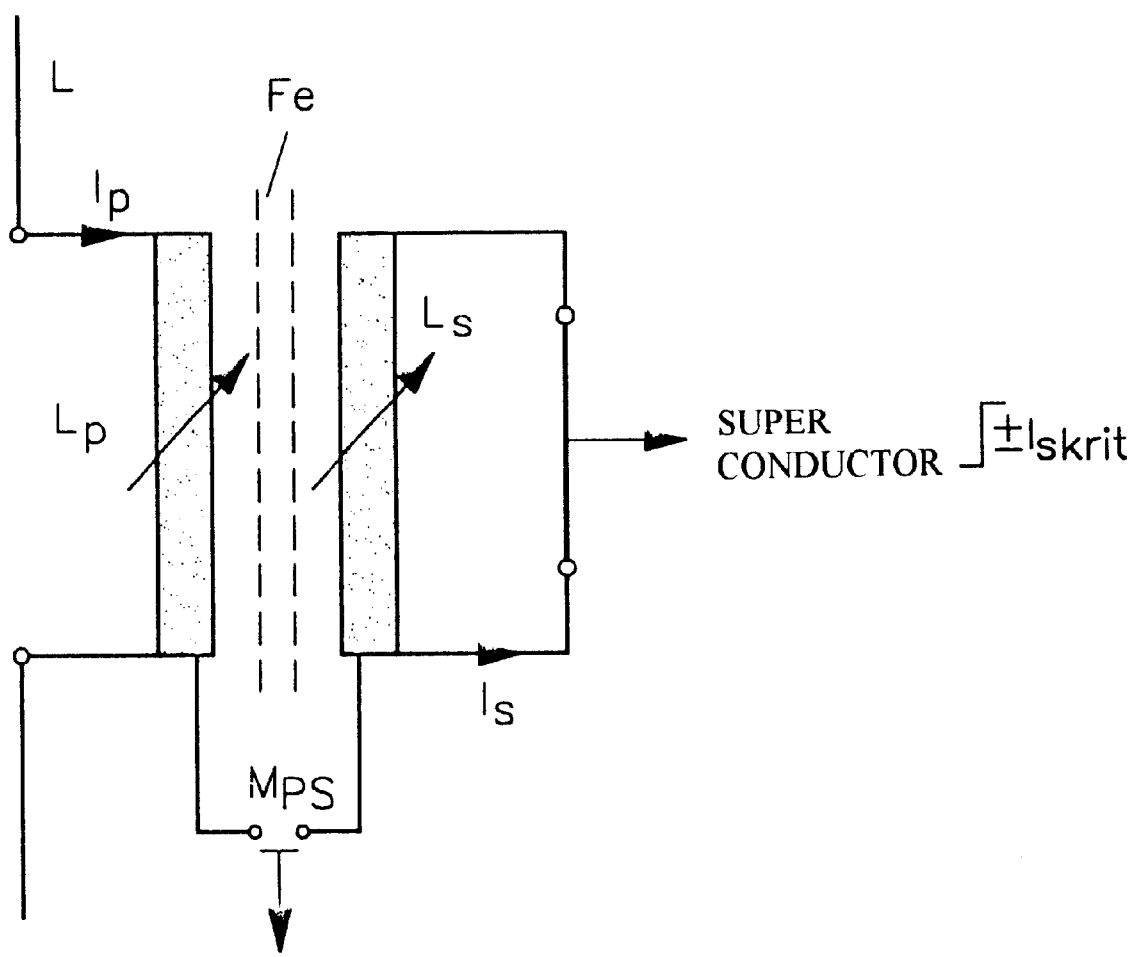
FIG. 3 shows a short circuit limiter in a circuit representation.

FIG. 3 shows the superconductive short circuit current limiter in an electrical circuit representation. The transformer is represented by the two variable inductivities $L_p$ and $L_s$ with an iron core Fe which includes a small cross-section $A_{Fe}$ in an area thereof. Both inductivities $L_p$, $L_s$ are coupled by way of the mutual induction $M_{ps}$, which is current dependent. The mutual induction $M_{ps}$ disappears when a fault or short circuit current occurs whereby $L_s$ is uncoupled from $L_p$. In an ideal situation, the mutual induction should assume only two states, like a switch, that is, it should provide for ideal magnetic coupling up to the response current level and complete magnetic uncoupling when short circuit currents $I>I_T$ occur.

What is claimed is:

1. A superconducting short circuit current limiter for an alternating current power supply net, comprising:
    an annular iron core for guiding a magnetic flux, a primary coil connected in said power supply net and being magnetically coupled with, and surrounding, one section of said iron core, a superconductive short-circuited secondary coil magnetically coupled with, and surrounding, another section of said iron core and being arranged in a spatially distant relationship from said primary coil, said iron core having two gaps at opposite sides of said secondary coil for thermally uncoupling the iron core section surrounded by said secondary coil from another section of said iron core, said one section of said iron core disposed in said primary coil having a cylindrical cavity, and a tertiary coil arranged within said cavity coaxially with said primary coil whereby said tertiary coil is magnetically coupled with said primary coil, said tertiary coil having a heat capacity so selected that said tertiary coil can accommodate the joulean heat generated when a fault or short circuit occurs in said power supply net, said iron core having in the area of said cavity a reduced cross-section providing for a magnetic flux restriction so selected that it becomes magnetic flux saturated when the current in said primary coil exceeds a predetermined reaction current.

2. A superconducting short circuit current limiter according to claim 1, wherein said two gaps are air gaps.

3. A superconducting short circuit current limiter according to claim 1, wherein said two gaps are filled with a heat insulating material.

4. A superconducting short circuit current limiter according to claim 1, wherein said two gaps are evacuated.

5. A superconducting short circuit current limiter according to claim 1, wherein said primary and secondary coils closely surround said iron core so as to contain the magnetic flux during normal operation of said current limiter.

6. A superconducting short circuit current limiter according to claim 5, wherein said secondary coil is in the form of a short-circuit cylinder and consists of a high temperature superconducting material.

* * * * *